United States Patent
DeForeest et al.

(10) Patent No.: US 7,421,427 B2
(45) Date of Patent: Sep. 2, 2008

(54) METHOD AND APPARATUS FOR ALLOWING HOST APPLICATION DATA TO BE ACCESSED VIA STANDARD DATABASE ACCESS TECHNIQUES

(75) Inventors: Chris DeForeest, Lynnwood, WA (US); William E. DeForeest, Snohomish, WA (US)

(73) Assignee: Attachmate Corporation, Seattle, WA (US)

( * ) Notice: Subject to any disclaimer, the term of this patent is extended or adjusted under 35 U.S.C. 154(b) by 392 days.

(21) Appl. No.: 10/150,089

(22) Filed: May 20, 2002

(65) Prior Publication Data

US 2003/0078916 A1    Apr. 24, 2003

Related U.S. Application Data

(60) Provisional application No. 60/330,412, filed on Oct. 22, 2001.

(51) Int. Cl.
G06F 17/30 (2006.01)
(52) U.S. Cl. .................. 707/4; 707/1; 707/3; 707/5
(58) Field of Classification Search .............. 707/203, 707/1–10; 715/503
See application file for complete search history.

(56) References Cited

U.S. PATENT DOCUMENTS

| | | | |
|---|---|---|---|
| 5,627,977 A | | 5/1997 | Hickey et al. |
| 5,889,516 A | | 3/1999 | Hickey et al. |
| 5,978,577 A | * | 11/1999 | Rierden et al. ............... 707/10 |
| 5,987,452 A | * | 11/1999 | Kung ............................ 707/4 |
| 6,003,026 A | * | 12/1999 | Bonzi ........................... 707/4 |
| 6,216,164 B1 | * | 4/2001 | Zaremba, Jr. ............... 709/227 |
| 6,223,180 B1 | * | 4/2001 | Moore et al. ................ 707/100 |
| 6,253,200 B1 | * | 6/2001 | Smedley et al. ............... 707/4 |
| 6,397,228 B1 | * | 5/2002 | Lamburt et al. ............. 707/203 |
| 6,584,480 B1 | * | 6/2003 | Ferrel et al. ................. 715/513 |
| 6,714,945 B1 | * | 3/2004 | Foote et al. .............. 707/104.1 |
| 6,836,780 B1 | | 12/2004 | Opitz et al. |
| 7,089,588 B2 | * | 8/2006 | Schaefer et al. ............... 726/22 |
| 7,124,413 B1 | * | 10/2006 | Klemm et al. .............. 719/313 |

OTHER PUBLICATIONS

Keohane, J., "50 Ways to Web Your Mainframe—Scrape the Screen, Gene," www.multi-platforms.com (Copyright 2000-2001).

Legacy extension solutions and software for CICS web-enablement, E-Business and E-Co., "Rescue your CICS and/or IMS applications from OS/3 mainframe island with ClientSoft legacy extension solution," www.wynsoft.co.uk (2000-2002).

Murphy, P., "The Marriage of ClientSoft and Tanit is Good for All Involved," ClientSoft:Products—ClientSoft Tanit Objects, www.clientsoft.com (Jan. 24, 2002).

(Continued)

*Primary Examiner*—Don Wong
*Assistant Examiner*—Sheree N Brown
(74) *Attorney, Agent, or Firm*—Nixon & Vanderhye P.C.

(57) ABSTRACT

Host systems can be accessed via industry standard query languages such as SQL by encapsulating the structure of the host application and allowing data to be retrieved or changed without knowledge of how the host application functions. Encapsulation and ability to use a standard database interface dramatically reduces the size, complexity and cost of developing clients.

11 Claims, 3 Drawing Sheets

OTHER PUBLICATIONS

CICS to Web and Internet middware from TanitObjects—The Productive Middleware Int . . . , "TanitObjects CICS and IMS Web enablement for Legacy applications (CICS and/or IMS to VB, VBA, Java, Enterprise Java . . ." www.wynsoft.co.uk (2000-2002).

TanitStream—The Productive Middleware/Enterprise Application Integration (EAI) . . . , Tanit Stream—3270 access for E-Business . . . , www.wynsoft.co.uk (2000-2002).

CICS to Web and Internet middware from TanitObjects—The Productive Middleware Int . . . , "TanitObjects CICS and IMS Web enablement for Legacy applications (CICS and/or IMS to VB, VBA, Java, Enterprise Java . . ." www.wynsoft.co.uk (2000-2002).

CientSoft, www.clientsoft.com, ClientSoft—Web services for CICS (Jun. 24, 2002).

White Paper, ClientSoft, "ClientSoft Tanit Objects", (Feb. 26, 2002).

White Paper, ClientSoft, "ClientBuilder Middleware Technology,".

Business Wire: "Attachmate's AuickApp Integrates Mission-Critical Data into Custon Application," Bellevue, Washington (Aug. 19, 1997).

\* cited by examiner

| SQL Statement | Filters | Inputs | Outputs |
|---|---|---|---|
| SELECT | X | | X |
| UPDATE | X | X | |
| INSERT | | X | |
| DELETE | X | | |

METHOD AND APPARATUS FOR ALLOWING HOST APPLICATION DATA TO BE ACCESSED VIA STANDARD DATABASE ACCESS TECHNIQUES

CROSS-REFERENCES TO RELATED APPLICATIONS

This application claims the benefit of Provisional Application No. 60/330,412, filed Oct. 22, 2001, entitled "Method And Apparatus For Allowing Host Application Data To Be Accesses Via Standard Database Access Techniques," the entire content of which is hereby incorporated by reference in this application

STATEMENT REGARDING FEDERALLY SPONSORED RESEARCH OR DEVELOPMENT

Not applicable.

FIELD OF THE INVENTION

This invention relates to providing interoperability between different computer applications, and more particularly, to techniques for abstracting one application (e.g., a host application) to allow a second application (e.g., a client application) to access the first application without having to be concerned about details of the first application. In still more detail, the invention relates to emulating an SQL server with a non-SQL host application, and to allowing one computer to use standard database querying protocols (e.g., the Standard Query Language) to access information stored in a substantially incompatible legacy or other host application.

BACKGROUND AND SUMMARY OF THE INVENTION

Anyone who has bought a personal computer or laptop for their home, office or school work can appreciate the meaning of planned obsolescence. Software developers are constantly adding new features requiring faster and more powerful hardware to run on, and hardware makers oblige by constantly improving the performance of the computer chips used to make personal computers. Sometimes it seems to the consumer as if there is a conspiracy going on that requires you to "upgrade" (i.e., replace) your entire personal computer set-up every two or three years or so.

The constant changes and improvements in computing equipment software means that better systems with improved performance and capabilities are always being developed. Many of these new systems are entirely incompatible with older computing equipment and software, and will not interoperate with them. This creates a significant problem for established businesses and organizations who want to continue using and receive value from the significant investment they have made in older computing systems and applications while nevertheless obtaining benefits of newer technology.

Despite the constant flurry of new software and hardware, the Y2K issue showed us all that some of the world's most important computer-driven process infrastructures are actually relatively old. Computer infrastructures that seem to have remarkable persistence are the numerous database and other specialized applications that long-established businesses, governments and other organizations rely on every day for crucial information.

Once a business or other entity has made the significant investment of purchasing or developing a specialized software application for one computing platform and then using it to input significant amount of data to build up a database, it is often very difficult (and may be extraordinarily expensive) for the business or other entity to change to another application on a different computing platform. The investment goes far beyond the computer equipment itself—the often hundreds or thousands of person-hours involved in inputting the data cannot be instantly duplicated. The investment becomes significantly more substantial if the software application was custom-developed since it is rarely straightforward to simply transfer or duplicate the functionality with another computing platform and associated application.

For example, beginning in about the 1960's and continuing through the early to mid 1990's, most businesses and other organizations generally relied on larger computers known as main frames or mini-computers (which were still relatively large) for their most critical computing needs. Companies such as IBM, Digital Equipment Corp. and Wang supplied the world with such larger computers and associated software, and business. Such computing systems generally included centralized larger computers—sometimes as big as an entire room. Users accessed such computers via so-called "dumb" terminals consisting of a display, a keyboard and a communications device but no real processing capabilities. Users would use the "dumb" terminals to input requests. The host computers would respond by sending the terminals display screens containing the requested data. Countless specialized applications such as accounting, database management, billing, inventory control, and all sorts of other functions were developed for these host computers. Many of these applications continue to be used today—despite the advent of the personal computer and the World Wide Web.

When computers-on-a-chip (microprocessors) were invented in the mid-1970s, people began building much smaller, "personal" computers. However, it was not until the late 1980's to early 1990's that businesses began widespread adoption of personal computer-based client-server networks instead of the larger host computers. Fueled by the Internet and the World Wide Web, personal computer (or smaller computing device) networks configured in distributed client-server fashion are now generally the computer infrastructure of choice for most businesses and other organizations. Even though the client-server architecture is now the platform of choice, many businesses and other organizations continue to maintain and rely on older, mainframe and minicomputer based systems for certain critical data—not necessarily because they prefer the older technology, but rather because the older technology continues to work ("if it's not broken, don't fix it") and it is often difficult and cost-prohibitive to migrate data and/or applications from the older "host" computing to newer client-server topologies.

Data that resides in the older, host applications can be very difficult to access by the newer, personal computer network (e.g., client/server) based technologies. The underlying storage format used in the older (or even newer) host-based applications often makes the use of a dumb terminal (or a terminal application emulating one) mandatory for retrieve or change. Prior approaches to this problem usually involved client programs, in conjunction with terminal emulation software, to "scrape" data from predefined locations on predefined screens supplied by the host application. In other words, such client programs would use terminal emulation software to retrieve data from the host application by making it appear to the host application as if it was being accessed by a conventional, older-styled dumb terminal capable of data input, display and not much more (when in fact the access was being performed by a personal computer or a server executing emulation software that made it appear to be a terminal). The resulting data screen formats the host application generated for display would then be "scraped" to harvest the needed data from predefined locations on predefined screens within this display information.

This prior approach provided some degree of interoperability but was no panacea. One problem that remained was that there was little or no abstraction from the terminal screen to the client programming applications programming interface (API). This meant that the newer-technology (e.g., personal computer based) client had to be programmed very specifically for the particular host application being accessed—forcing a one of a kind, custom client solution that was relatively expensive to develop and required a significant amount of expertise to develop and put into place.

In September 1999, WRQ, Inc. released a product called APPTRIEVE (also known as Veristream Host Integrator 3.5) that took a significant step toward the goal of abstraction by exposing host data screens as objects. WRQ's APPTRIEVE software was intended to provide an application mining solution that enables organizations to quickly and easily build e-business applications that integrate legacy data from IBM mainframe, AS/400, VAX and UNIX host systems. APPTRIEVE gives web application developers with no expertise in host systems easy, object-based access to legacy business logic without requiring any custom programming, or alterations to the host system. Generally, such APPTRIEVE software provides a graphical legacy application mapping tool, a development kit, and a powerful server that graphically maps the legacy application, builds a new application and deploys the new application. With a simple point-and-click interface, APPTRIEVE provided an ability to create a graphical map of desired legacy data and then make it accessible via a Java Bean or COM object.

The APPTRIEVE/VERASTREAM server technology could be regarded as an "integration broker", i.e., a type of middleware that straddles diverse systems and technologies to unite dissimilar data sources. Before integration brokers, teams of programmers had to build point-to-point connections between systems on a case-by-case basis. Every new system that was added to the configuration required additional custom coding. What's more, maintaining those connections each time a new feature was added or an application was upgraded weighed heavily on IT budgets. The integration broker overcomes these limitations by virtue of its hub-and-spoke configuration. It serves as the hub, so adding a new system means connecting it directly to the integration broker. Then, all existing systems, which are already linked to the integration broker, can instantly interact with the new system. Running in cooperation with application servers (such as IBM WebSphere, BEA WebLogic, or Sun iPlanet), integration brokers allow companies to integrate legacy data and applications with new components developed in C/C++, Java, or Visual Basic®. Integration brokers can also expose legacy applications as EJB (Enterprise Java Beans), CORBA, or DCOM components.

While WRQ's APPTRIEVE/VERASTREAM solution was successful in allowing the client to interoperate with the host application by making the host application data appear to be a data object to the client for access using standard database formats, the client API still required a programmer to understand the structure of the host application. Most client API programmers, such as web developers, have little or no experience with the host applications and do not really care to learn the older software. Moreover, since requests were made on a per-screen basis, many network roundtrips between the client and the APPTRIEVE server were necessary for even the most basic access. Accordingly, further improvements were necessary and desirable.

The present invention provides such further improvements by encapsulating the host application so it can be abstracted and accessed by industry standard query languages such as the Standard Query Language (SQL). By encapsulating the structure of the host application, clients can retrieve or change data on the host without knowledge of how the host application functions. Since the data requests can be made via such standard access techniques, most kinds of data access can be accomplished in a single network roundtrip between client and server.

In accordance with an aspect provided by preferred illustrative embodiments of this invention, techniques are provided for abstracting the details of an application (e.g., including but not limited to an application running on a Legacy host computer and intended to be accessed via terminals) so that data from the application can be efficiently accessed and provided to otherwise incompatible equipment and software (e.g., a modern personal-computer or other based client using the SQL or other industry standard protocols and conventions).

In accordance with another aspect provided by an illustrative and preferred exemplary embodiment of the invention, a method of abstracting a host application so it can be accessed efficiently from a requester that is substantially non-interoperative with the host application involves establishing a model of said host application; resolving requests from said requester into at least one procedure; executing said at least one procedure in conjunction with said model in response to a request from said requestor to generate at least one host request and to elicit at least one host response, said executing step including at least one of: providing at least one input parameter obtained from said request to said host application, and providing at least one data item elicited from said host application to said requester.

In accordance with one aspect provided by an illustrative and preferred embodiment, standard database access requests from a requestor are parsed and resolved into one or more access procedures. These access procedures are executed (e.g., each in turn) to send requests to an application and to receive responses and extract relevant information from those responses. The extracted information can be optionally filtered before being returned to the requester.

In accordance with another aspect of an exemplary and illustrative embodiment, the request is structured as an industry-standard (SQL or other relational) database requests. Such requests are parsed to extract parameters, and are then mapped into a set of predefined procedures that are created to generate application-specific requests that elicit desired responses (e.g., call up a certain input screen in the host application, fill in certain fields within the input screen with certain parameters, send an enter or other command to the host application that requests the host to process the inputted parameters and provide a response screen, extract desired data from predefined locations within a host-provided response screen, and provide the extracted data to the requester).

The accessing techniques provided in accordance with the preferred exemplary embodiments of this invention allow the client or other requester to be completely insulated from the details of the host application. The client or other requester can communicate its request in an industry standard or other language, and the request will be interpreted and translated automatically into an appropriate set of requests to the host application in the requesting language or other protocol that the host application understands. Similarly, host responses once received will be analyzed automatically and appropriate information extracted from them and provided to the requester in the requester's own language. Advantages include allowing businesses and other organizations to continue to efficiently make use of legacy and otherwise-incompatible applications while allowing users to embrace and more fully utilize newer, often more powerful and versatile technologies such as client-server based computing system. Furthermore, the ability to use otherwise incompatible (e.g., industry standard) database interfaces can dramatically reduce the size, complexity and cost of developing new interfaces. For example, such encapsulation may prove to be important in integrating with many third party tools. Additionally, the user of database drivers (e.g., JDBC) can enhance functionality for business partner tools that already use industry standard interfaces to access "backend" systems such as relational databases.

BRIEF DESCRIPTION OF THE DRAWINGS

These and other features and advantages provided in accordance with exemplary and illustrative embodiments of the present invention may be better and more completely understood by referring to the following detailed description in conjunction with drawings, of which.

DETAILED DESCRIPTION OF PRESENTLY PREFERRED EXAMPLE EMBODIMENTS

Figure 1:
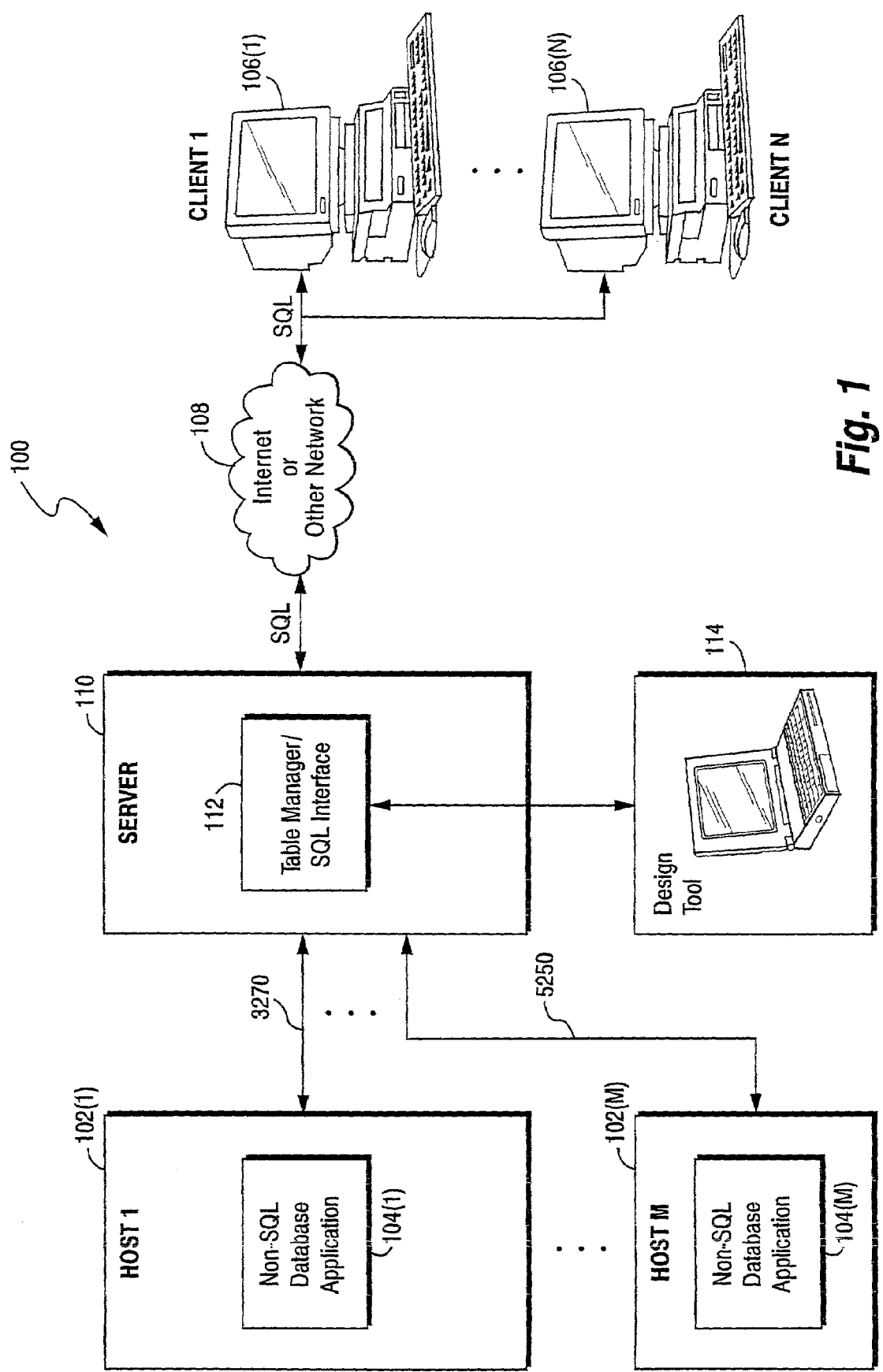
FIG. 1 is a block diagram of an exemplary and illustrative preferred system embodying the invention.

FIG. 1 is a block diagram of an overall example illustrative preferred system 100 embodying the present invention. Exemplary system 100 includes one or more host computers 102 each running one or more associated host applications 104. In the particular illustrative example shown, each host computer 102 may run a non-SQL-based database application designed to be accessed by a so-called "dumb" terminal using a standard terminal protocol such as, for example, 3270, 5250, Telnet or the like. For example, host computers 102 might comprise IBM DEC, UNIX or other conventional mainframe or mini-computers running conventional host applications 104 of any sort including, for example, accounting software, contact management software, customer management software, driver license management software, or any or all of a number of useful applications.

FIG. 1 also shows exemplary client user workstations 106 connected to a network 108 such as for example, the Internet, a local area network, a wide area network, a telephone network, or any other type of communication arrangement. Client-based workstations 106 are shown in FIG. 1 as being personal computers, but they could comprise virtually any type of user or other computer accessing device including but not limited to personal digital assistants (PDAs), web browsing television or other appliances, cellular telephones, set top boxes, etc.

In the example and illustrative embodiment shown in FIG. 1, client appliances 106 wish to access or obtain information stored in host applications 104 using protocols and/or query languages that are different from those for which the host applications were designed. In one particular advantageous and preferred example, client appliances 106 run software that understands and generates requests based in an industry standard relational database access language such as, for example, Standard Query Language (SQL). Alternatively, client appliances 106 may use HTML, XML or other web-based protocols to communicate with a webserver (not shown) that, in turn, generates SQL requests for database information.

In the example embodiment, host applications 104 do not understand SQL. Thus, in the exemplary embodiment, i.e., the language "spoken" by client applications 106 is incompatible with and not interoperable with host applications 104. Nevertheless, it is desirable to allow client appliances 106 (or a web server they connect to) to access host applications 104 and the information stored thereby.

In accordance with an aspect of the exemplary and illustrative embodiment of system 100 shown in FIG. 1, a host integration server 110 intermediates between client appliances 106 and host applications 104 by providing a translation capability that effectively abstracts the details required to access host applications 104 so that client appliances 106 need not be concerned with such details of the host application but can simply make requests in the languages and protocols they understand and receive back responses that intermediating server 110 derives from the host applications 104.

In more detail, intermediating host integration server 110 may include, as one of its own applications, a table manager/SQL interface 112. This table manager/SQL interface 112 acts as "middleware" to abstract the details of host application 104 and to respond to requests initiated by client appliances 106 by translating or mapping them into appropriate requests to host application 104 and by analyzing host application responses and providing responsive information to the client appliances.

In the example embodiment shown in FIG. 1, the table manager/SQL interface 112 may operate in conjunction with conventional host integration server software such as for example, the APPTRIEVE/VERASTREAM application sold by WRQ, Inc. System 100 shown in FIG. 1 improves upon this preexisting technology by providing a table manager/SQL interface 112 that encapsulates the host applications 104 allowing data to be retrieved or changed without client applications 106 having knowledge of how the host application functions. That is, the FIG. 1 system 100 builds upon the object-based access technology provided by the conventional APPTRIEVE solution by taking an additional step of insulating client appliances 106 from the resulting objects so that the clients can "talk in their own language" to issue database requests without being concerned about details of the way host applications 104 must be accessed to write such data to the host and/or to provide appropriate responsive information. All such access interfacing details are taken care of by the table manager/SQL interface 112 in the example illustrative embodiment.

As shown in FIG. 1, some customized programming via a design tool 114 is performed so that the table manager/SQL interface 112 can have an accurate model of the host applications 104. In other words, the table manager/SQL interface 112 in the exemplary embodiment needs to understand on a detailed level how to communicate with the host applications 104—but by doing so the table manager/SQL interface 112 insulates the client appliances 106 from having to have this specialized knowledge. The resulting arrangement frees the designers of client appliances 106 from having to know anything about the host applications 104. Standard, conventional industry-wide hardware and software can be used to implement clients 106, and table manager/SQL interface 112 takes care of the often-messy and complicated details and specialized access requirements of the various particular host applications 104. Thus, system 100 has the advantages of among other things, freeing client appliances 106 from having to have any specialized customization based on particular host applications 104, and centralizing and making more efficient the customizations within intermediating server 110.

Figure 2:
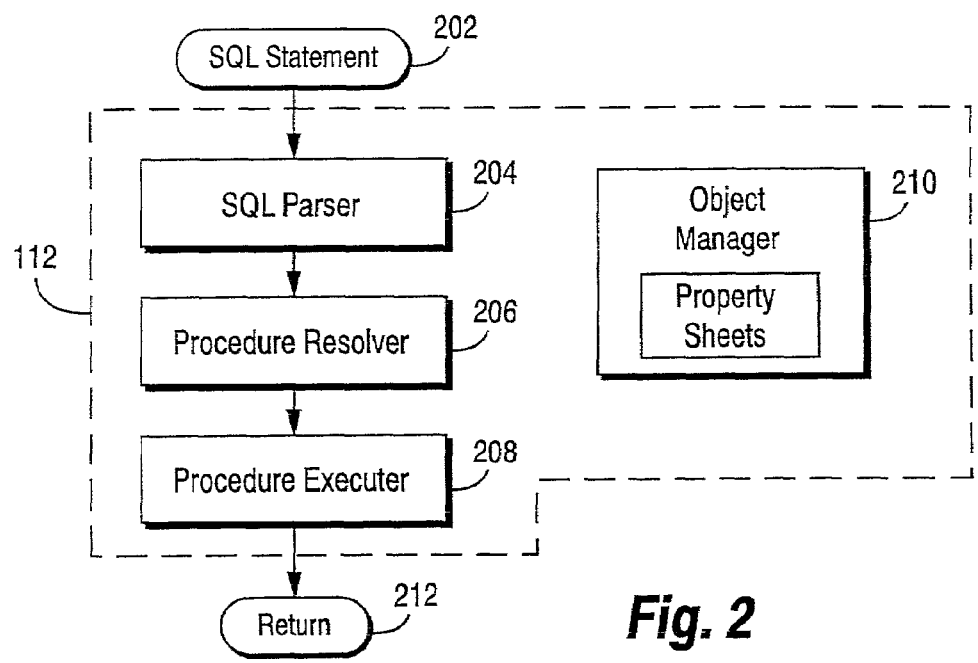
FIG. 2 is a flowchart of an example illustrative preferred structure for the FIG. 1 table manager/SQL interface block.

FIG. 2 shows an example structure for exemplary and illustrative table manager/SQL interface 112 in the FIG. 1 embodiment 100. As shown in FIG. 2, the table manager/SQL interface 112 receives a request (e.g., an SQL statement) from one of client appliances 106 (block 202). The table manager/SQL interface 112 parses that SQL statement with an SQL parser 204 to determine what the request is trying to do and to obtain necessary input parameters from the request. In the exemplary and illustrative embodiment, a procedure resolver 206 resolves or maps the parsed request into one or more procedures. A procedure executor 208 executes the procedures resolved by procedure resolver 206 in order to generate one or more requests to one or more host applications 104, to receive the results from the host application(s), and to extract relevant data and provide the data back to the requesting client 106.

Figure 3:
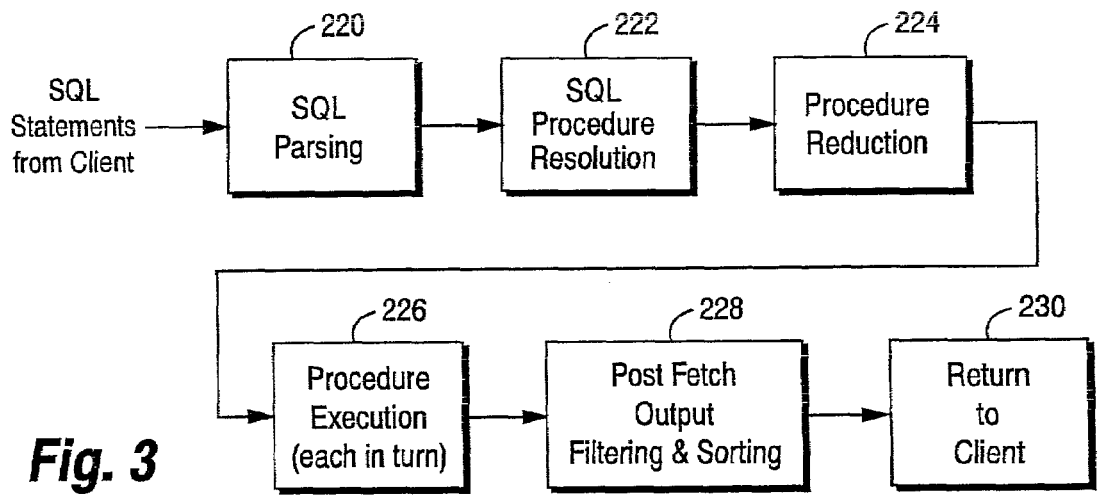
FIG. 3 is a flowchart of a preferred exemplary and illustrative process.

FIG. 3 is a more detailed flowchart of the steps performed by the table manager/SQL interface 112 shown in FIGS. 1 and 2. As shown in FIG. 3, SQL request statements from clients 106 are parsed (block 220) and resolved into procedures (block 222). These procedures are then reduced (block 224) and executed one at a time in turn (block 226) in order to generate host application 104 requests and receive associated responses. The host application 104 responses may be filtered, sorted or otherwise processed (block 228) and returned to the requesting client (block 230).

Figures 5, 6:
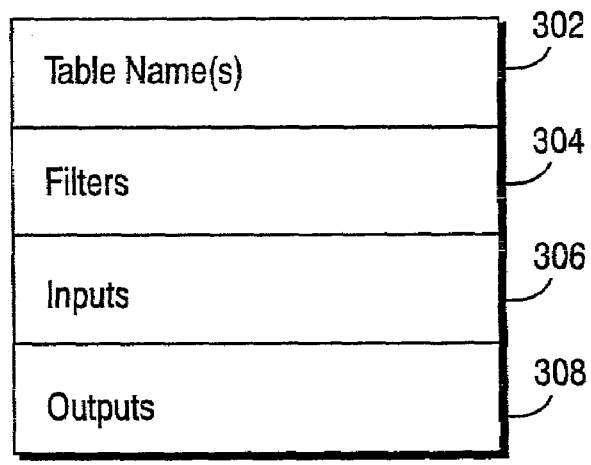
FIG. 5 shows an example parsing correspondence.
FIG. 6 shows an example procedure properties list.

In more detail, incoming SQL statements are first handled by the SQL parser 220. The parser 220 in the exemplary embodiment converts the SQL string into a parse tree. FIG. 5 shows some exemplary SQL statements (SELECT, UPDATE, INSERT, and DELETE) that can be parsed by the SQL parser 220 along with associated filters, inputs and outputs that are used to resolve the parsed SQL statements into one or more procedures.

In the example embodiment, SQL parser 220 may understand most but not necessarily all of the SQL or other industry standard language used by client appliances 106. In general, it may not be necessary, desirable or cost-effective to implement the entirety of the industry standard SQL or other query language on table manager/SQL interface 112. Thus, for example, the table manager/SQL interface 112 may understand the most common SQL queries but may not understand some of the more unusual queries. This is not necessarily a disadvantage given the fact that the host application 104 is not a true SQL application such that it will often be unable in any event to provide (or may be too much trouble to provide) particularly sophisticated SQL functionality. In the example embodiment, the table manager/SQL interface 112 can return an SQL "not supported" error if unimplemented features are requested. Of course, different embodiments can have different amounts of completeness, and the invention is not limited to any such level of completeness. Additional details concerning how one specific exemplary embodiment of SQL parser may parse particular SQL commands are presented at the end of this specification.

Once an incoming SQL statement is converted into a parse tree by the SQL parser 204, a set of predefined procedures are found that can fulfill the request. The basic strategy performed by the procedure resolution step 222 in the exemplary embodiment is to find the set of procedures that match the filters, inputs and outputs found in the incoming SQL statement. The SQL procedure resolution step 222 performed by procedure resolver 206 extracts information from the SQL statement and matches it to a set of procedures that have been predefined in the exemplary embodiment. In the illustrative embodiment, these procedures have been predefined in the exemplary embodiment based on models of the host application created by programmers navigating the host screens and storing corresponding storage formats such as templates.

FIG. 6 shows four types of information that the procedure resolution step 222 may extract from the incoming SQL statement:

table name, filters, inputs, outputs.

In the example embodiment, the table name 302 shown in FIG. 6 specifies the table within a template that the SQL statement is acting upon. Briefly, the SQL procedure resolution step 222 uses the SQL parsing tree 220 to obtain a particular table name from a particular predefined part of the SQL statement that depends upon the particular SQL statement. For example SQL SELECT statements identify table names in the FROM clause, UPDATE statements identify table names in the UPDATE clause, INSERT statements identify table names in the INSERT INTO clause, and DELETE statements identifying table names in the DELETE FROM clause. In one exemplary embodiment, an SQL statement may only act against one table, but other embodiments may permit a single SQL statement to act against multiple tables.

The filters shown in FIG. 6 specify which records the SQL statement will act upon. In the exemplary embodiment, any column referenced in the statement's WHERE clause is a filter.

The inputs 306 shown in FIG. 6 are, in the example embodiment, the values the statement is to assign to columns of the identified table. In an UPDATE statement, these inputs may appear, for example, in the SET clause while in an INSERT statement they may appear in the VALUES clause. The outputs 308 shown in FIG. 6 are, in the example embodiment, the columns the statement is to return. Any column referenced in the SELECT clause is an output in the example embodiment. FIG. 5 summarizes various SQL statements and correlates them with whether they have filters 304, inputs 306 and outputs 308.

In the exemplary embodiment, for SELECT, UPDATE and DELETE SQL statements, the WHERE clause is expanded into sets of AND comparisons, OR'ed together. Each set of AND comparisons is resolved into its own procedure in the example embodiment. For some SQL statements, there may not be a procedure that matches a set of AND comparisons, in which case, the SQL execution fails. For SELECT statements, any procedure that returns a super set of records is considered a match (e.g., a post fetch output filtering and sorting step 228 can be used to remove any unrequested records in the exemplary embodiment).

In the exemplary embodiment, once the SQL procedure reduction step 222 resolves the SQL statement into a set of procedures, the procedure reduction step 224 performed by the procedure reducer 206 removes any redundant procedures. The procedure reducer 206 and its associated procedure reducer step 224 also, in the example embodiment, checks to make sure that all procedures will return unique records. Take the following SQL statement as an example:

SELECT*FROM Accounts WHERE AcctID=10000
    OR LastName='Smith'

This exemplary statement will resolve into two procedures in the exemplary and illustrative embodiment because of the OR in the WHERE clause. The first procedure in the exemplary embodiment may search for any records with AcctID=10000 while the second procedure in the exemplary embodiment may search for any records with LastName='Smith'. However, in the exemplary embodiment, if a record meets both conditions it will be returned by both procedures—resulting in a duplicate record in the output. To avoid this problem, the exemplary embodiment may either filter out any records from the first procedure that have LastName='Smith', or filter out any records in the second procedure that have AcctID=10000. In the exemplary embodiment, if neither of these two things can be done, the SQL execution fails because the output may include invalid duplicate records.

After the procedure resolver 206 performs the procedure reduction step 224, the procedure executor 208 executes the procedures each in turn (step 226). Briefly, in the example embodiment, step 226 is performed based on the model of the host application that models the various screens in the host application 104. The procedure executor 208 thus executes the procedures in order to effectively translate into the languages and/or protocols that the host application(s) 104 understands. The procedures then invoke any number of host application 106 data input and/or output screens. Data obtained from the SQL statements can be placed into predetermined fields or other locations within the host screens, and similarly, data obtained from predetermined fields or other locations within the host data screens can be extracted and provided to the client appliance. In this way, the client appliances can automatically access (read from and/or write to) the host applications 106 without the clients needing to know anything about the detailed screen structure or operation of the host application. From the standpoint of the client appliances, the host application appears to be an SQL database server; thus, table manager/SQL interface 112 could be thought of as being an SQL server emulator in the exemplary embodiment since it emulates an SQL server from the standpoint of the client appliances but is actually navigating screens or other non-compatible input/output protocols of the host application(s) 106.

Figure 4:
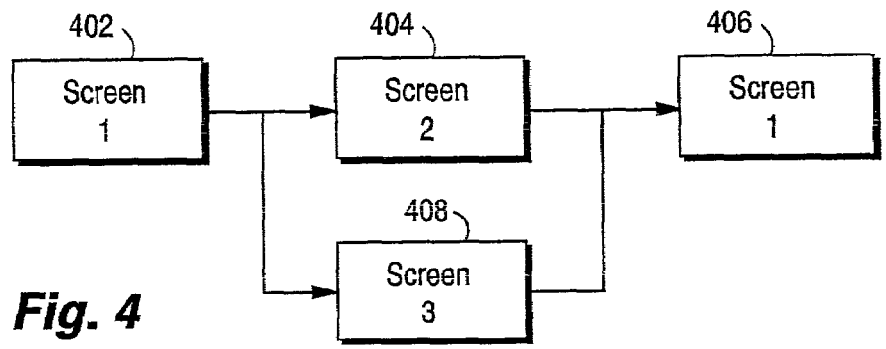
FIG. 4 shows exemplary procedure screen accesses.

FIG. 4 shows one example set of host accesses and responses that might be elicited by the procedure executor 208 executing one procedure. As shown in FIG. 4, executing a procedure might result in generating appropriate 3270, 5250, Telnet, VT100 or other host emulation data streams that result in accessing a host computer 102's host application 104 to call up a first host application screen 402. In this illustrative example, one or more input parameters obtained from the SQL statement (for example, a particular value for a first name or last name or a particular account ID) may be supplied by table manager/SQL interface 112 within a predetermined portion of the host application 104 access stream (i.e., field within screen 402) and sent back to host computer 102. This action may elicit a further responsive screen(s) 404 from host computer application 104 containing some information desired to be elicited from the host (e.g., data from a database stored by the host or confirmation that the host has taken a certain action in updating or changing the data it stores), or perhaps requesting additional information or other action. The procedure executor 208 may "scrape" or otherwise extract or obtain the desired host data responses from this responsive host data. Such host screens may be interfaced with additional screens (blocks 406, 408) until the necessary and desired information has been supplied and/or obtained from/to the host in the form of screen display data streams. There is no reason why multiple procedures cannot invoke accesses to different host applications 106 and/or different host computers 102 so that a single SQL statement from a client appliance 106 might provide responsive information and./or action from multiple host applications 104—allowing multiple host applications to effectively be emulated as a single SQL database from the standpoint of the client appliances 106.

In the example embodiment, a single SQL statement may invoke multiple procedures to be executed by procedure executor 208. Thus, for example, in the example embodiment, a single SQL statement provided by a client appliance 106 may cause table manager/SQL interface 112 to send numerous screen requests and other data to host application(s) 104 and receive responses based upon one or more than one procedure resolved and reduced by the table manager/SQL interface 112.

The resulting data obtained from host application(s) 104 may then be filtered and/or sorted before being returned to client appliance 106 in the form of an SQL response. In the example embodiment, output filtering step 228 for SQL SELECT statements may ensure that only those rows that exactly match the WHERE clause are returned to the client application 106. In the exemplary embodiment, the output of a procedure may be a superset of what the user actually requested with the WHERE clause. In the exemplary embodiment, any row that does not match the WHERE clause is removed from the output row set. Additional filtering is preferably also performed at this time as imposed by the procedure resolver 206 to eliminate duplicate records. In the exemplary embodiment, sorting may be optionally performed by block 228. For example, if an SQL SELECT statement includes and ORDER BY clause that imposes or requests the output row set to be sorted in a particular order, then the filtering and sorting step 228 implements that functionality by sorting the returned data as requested and required. If no ORDER BY clause is present, then results are returned in any arbitrary order in the exemplary embodiment.

Example Host Application Modelling and Persistent Procedure Data

As mentioned above, design tool 114 is used in the exemplary embodiment to customize the table manager/SQL interface 112 for the particular host applications 104 to be accessed. In the exemplary embodiment, the table manager/SQL interface 112 contains and maintains, as persistent data, the definitions of all tables, columns and procedures in an example template format. This template is saved as part of a model file. A summary of the information contained in such templates is shown below:

Table Properties

Name-Name of the table
Home Screen-The host screen that all procedures for the table begin and end on
Columns-A set of columns
Procedures-A set of procedures -continued Column Properties Name-Name of the column
DataType-The column datatype can be String, Integer, or Float
Max Length-The maximum string length for the column. Applies only to String columns.
Min Length-The minimum string length for the column. Applies only to String columns.
Max Value-The maximum numeric value for the column. Applies only to Integer columns.
Max Value-The maximum numeric value for the column. Applies only to Integer columns.

Procedure Properties

Name-Name of the procedure
Type-The procedure type can be Select, Update, Insert, or Delete
Available for SQL-Bit flag that indicates the procedure can be used to fulfill a SQL statement.
Filters-The set of filter columns (Select, Update, and Delete procedures only)
Inputs-The set of input columns (Update and Insert procedures only)
Outputs-The set of output columns (Select procedures only)
Implementation-The procedure implementation contains the host screen navigation order and data to filter/input/output mappings for each.

The table definitions are kept in the illustrative Tables storage format of object manager 210 in the example embodiment. The tables, procedures, columns, etc contained in this storage format all have unique object IDs so that their definitions maybe quickly located. All references to these objects can be made via their object ID since this is the only property that never changes once an object is created. All other properties of an object are subject to change, including pointers to the definition storage format.

Detailed SQL Parsing Step 220

The following outlines one exemplary and illustrative basic SQL parsing technique that may be implemented by the SQL parser 204:

Table and Column Names

TableName::=Identifier

ColumnName::=[TableName.]Identifier

Identifier::={RegularIdentifier|DelimitedIdentifier}

A regular identifier is a string of not more than 128 characters, of which the first is a letter (upper or lower case), while the rest can be any combination of upper or lower case letters, digits, and the underscore character. No SQL reserved words are used in the example embodiment.

A delimited identifier is any string of not more than 128 characters enclosed in double quotes. The double quote character is represented by two immediately adjacent double quotes.

Literals

Literal::={CharacterString|Number}

Character strings are written as a sequence of characters enclosed in single quotes. A single quote character is represented by two immediately adjacent single quotes. Any comparisons between literals and columns are between the same type in the example embodiment: strings are compared to strings and numbers are compared to numbers.

Expressions

Expression::={Expression+Expression|Expression−Expression|Expression*Expression|Expression/Expression|−Expression|(Expression)
|Literal|ColumnName}

Conditions

Condition::={Condition OR Condition|Condition AND Condition|NOT Condition|(Condition)
|Comparison}

Comparison::=Expression {=|<>|<|<=|>|>=|LIKE} Expression

SimpleCondition::={SimpleCondition OR SimpleCondition|SimpleCondition AND SimpleCondition|(SimpleCondition)|SimpleComparison)

SimpleComparison::=ColumnName{=|LIKE} Literal

The distinction between Conditions and SimpleConditions is used because SimpleConditions are used as inputs to a procedure. SimpleConditions can be used in any WHERE clause, but Conditions can only be used in a SELECT statement's WHERE clause since its results can be post-fetch filtered. Both Conditions and SimpleConditions can refer to columns from one table.

SELECT Statement

SELECT [DISTINCT|ALL]
{*|{TableName.*|Expression [[AS]Name]][, . . . n]}}

FROM TableName
[WHERE Condition]
[ORDER BY {ColumnName|ColumnNumber}[, . . . n][ASC|DESC]]

The select statement returns only those rows exactly matching the WHERE clause. This rowset is sorted in the order specified in the ORDER BY clause. For procedure resolution, the table name is taken from the FROM clause, the filters are taken from the WHERE clause and the outputs are taken from the SELECT and WHERE clauses.

UPDATE Statement

UPDATE TableName
SET ColumnName=Literal [, . . . n]
[WHERE SimpleCondition]

The update statement updates all records matching the WHERE clause with the values in the SET clause. For procedure resolution, the table name is taken from the UPDATE clause, the filters are taken from the WHERE clause, and the inputs are taken from the SET clause.

INSERT Statement

INSERT INTO TableName [(ColumnName [, . . . n])]
VALUES (Literal [, . . . n])

The insert statement adds a record to the specified table. For procedure resolution, both the table name and the inputs are taken from the INSERT INTO clause.

DELETE Statement

DELETE FROM TableName
[WHERE SimpleCondition]

The delete statement deletes a record from the specified table. For procedure resolution, the table name is taken from the DELETE FROM clause and the filters are taken from the WHERE clause.

While the invention has been described in connection with what is presently considered to be the most practical and preferred embodiment, it is to be understood that the invention is not to be limited to the disclosed embodiment. For example, although examples above allow access to legacy or other host applications to provide access to host data, other embodiments may use the techniques herein to access any other sort of applications (e.g., non-legacy applications, web server based applications, non-host-based applications, or any other sort of applications). Similarly, while the exemplary embodiments allow access by client appliances using industry standard SQL database techniques, aspects of the invention is not to be limited to SQL, database accesses, or client-server architectures, but rather, encompasses other alternatives and arrangements. Thus, the invention is intended to cover various modifications and equivalent arrangements included within the scope of the appended claims.

We claim:

1. A method of providing access to a screen-based host application presenting a screen-based user interface, by a SQL application that is otherwise non-interoperable with said screen-based host application, said method comprising:
    (a) encapsulating structure of the screen-based host application into a model to allow data to be changed or retrieved using the screen-based host application screen-based interface, said model insulating said SQL application from needing to interact directly with the screen-based host application;
    (b) parsing a query request for structured data from the SQL application;
    (c) using said model to resolve at least some aspects of said parsed request into at least one procedure to thereby map said parsed request into one or more requests to access screens of said screen-based host application;
    (d) performing said procedure to thereby generate at least one screen-based access request to said screen-based host application including placing data from SQL statements into predetermined fields of a host screen;
    (e) applying said at least one request to said screen-based host application and scraping data from predetermined fields within at least one host screen to thereby extract data therefrom and generate a response; and
    (f) delivering at least a portion of said generated response as structured data to said SQL application in response to said query request.

2. A method as in claim 1 wherein said SQL application provides a request in Standard Query Language, and said parsing step comprises parsing said request into a parse tree.

3. The method as in claim 1 wherein said screen-based host application runs on a host computer.

4. The method as in claim 3 wherein said host computer is a minicomputer or a mainframe.

5. The method as in claim 3 wherein said host computer comprises a IBM mainframe, VAX, UNIX or AS/400 computer.

6. The method as in claim 1 wherein said steps (a)-(f) are accomplished in a single network roundtrip involving the SQL application.

7. The method as in claim 1 wherein said resolving step comprises resolving said request into predefined procedures that perform predefined tasks.

8. The method as in claim 1 wherein said providing step includes filtering and/or sorting screen-scraping results from said screen-based host application.

9. The method as in claim 1 wherein said SQL application is a client-server application.

10. A method of providing efficient access to a screen-based host application from a requesting SQL application that is substantially non-interoperative with said screen-based host application while insulating said requesting SQL application from details of screen-based host application access, said method comprising:
    establishing a model of said screen-based host application;
    resolving query requests from said requesting SQL application into at least one procedure to thereby translate said parsed request into one or more requests to said screen-based host application;
    executing said at least one procedure in conjunction with said model in response to a request from said requesting SQL application to generate at least one host request and to request at least one host response, said executing step including at least one of:
    providing at least one input parameter obtained from said request to said screen-based host application,
    thereby extracting data from at least one substantially unstructured host screen, and
    providing at least one data item elicited from said screen-based host application as structured data to said requesting SQL application,
    wherein said executing comprises scraping at least one screen of said screen-based host application by extracting data from predetermined fields within said at least one screen.

11. The method as in claim 10 wherein said screen-based host application is incompatible with SQL and said requestor communicates at least in part using SQL.

* * * * *